US010567203B2

(12) United States Patent
Wang et al.

(10) Patent No.: US 10,567,203 B2
(45) Date of Patent: Feb. 18, 2020

(54) CHANNEL PARAMETER ESTIMATION METHOD AND RELATED APPARATUS

(71) Applicant: HUAWEI TECHNOLOGIES CO., LTD., Shenzhen, Guangdong (CN)

(72) Inventors: Fan Wang, Dongguan (CN); Tao Ouyang, Wuhan (CN); Li Zhang, Wuhan (CN); Xiaolong Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/365,922

(22) Filed: Mar. 27, 2019

(65) Prior Publication Data
US 2019/0222448 A1 Jul. 18, 2019

Related U.S. Application Data

(63) Continuation of application No. PCT/CN2016/100394, filed on Sep. 27, 2016.

(51) Int. Cl.
*H04B 3/00* (2006.01)
*H04L 25/00* (2006.01)
(Continued)

(52) U.S. Cl.
CPC ........ *H04L 27/2607* (2013.01); *H04L 5/0046* (2013.01); *H04L 12/2801* (2013.01); *H04L 12/2858* (2013.01)

(58) Field of Classification Search
CPC ............. H04L 27/2607; H04L 5/0046; H04L 12/2801; H04L 12/2858; H04B 3/32; H04B 7/0848; H03M 13/2707; H04M 3/305
(Continued)

(56) References Cited

U.S. PATENT DOCUMENTS 6,829,293 B2 * 12/2004 Jones .................... H04M 3/305
375/222
2005/0052993 A1 3/2005 Hanks et al.
(Continued)

FOREIGN PATENT DOCUMENTS

| CN | 101702634 A | 5/2010 |
| CN | 102255719 A | 11/2011 |
| CN | 105009502 A | 10/2015 |

OTHER PUBLICATIONS

Sawyer, "Management Information Base for Data Over Cable Service Interface Specification (DOCSIS) Cable Modem Termination Systems for Subscriber Management," RFC4036, Network Working Group, Request for Comments: 4036, Category: Standards Track,Apr. 2005, 27 pages.
(Continued)

*Primary Examiner* — Phuong Phu
(74) *Attorney, Agent, or Firm* — Fish & Richardson P.C.

(57) ABSTRACT

The present disclosure provides example channel parameter estimation methods and related apparatuses. In one example method, a cable modem (CM) obtains a second data frame through a downlink channel between the CM and a cable modem termination system (CMTS). The second data frame is generated after a first data frame sent by the CMTS is modulated through the downlink channel, a zero-bit-loaded symbol of the first data frame includes no valid codeword, but includes a zero-bit-loaded NCP and an idle codeword identified by the zero-bit-loaded NCP, and the idle codeword includes a data sequence used for channel parameter estimation. The CM can estimate a channel parameter of the downlink channel based on a data sequence in an obtained zero-bit-loaded symbol of the second data frame and the data sequence in the zero-bit-loaded symbol of the first data frame.

20 Claims, 7 Drawing Sheets

(51) Int. Cl.
   *H04L 27/26*      (2006.01)
   *H04L 5/00*       (2006.01)
   *H04L 12/28*      (2006.01)

(58) Field of Classification Search
   USPC .................. 375/257, 346, 210, 220, 222
   See application file for complete search history.

(56) References Cited

U.S. PATENT DOCUMENTS

| | | |
|---|---|---|
| 2010/0195774 A1* | 8/2010 | Lopez de Victoria ...................... H04B 7/0848 375/343 |
| 2013/0028253 A1 | 1/2013 | Chapman et al. |
| 2015/0063484 A1* | 3/2015 | Kliger ............... H03M 13/2707 375/267 |
| 2017/0019283 A1 | 1/2017 | Zhang et al. |
| 2019/0123856 A1* | 4/2019 | Ouyang .................. H04B 3/32 |

OTHER PUBLICATIONS

NGB Broadband Access System, "Technical Specification of C-DOCSIS," GY/T 266-2012, People''s Republic of China Radio, Film and Television Industry Standards, Aug. 17, 2012, 111 pages.
Cable Television Laboratories, Inc., "Data-Over-Cable Service Interface Specifications, DOCSIS® 3.1," Physical Layer Specification, CM-SP-PHYv3.1-I02-140320, Jan. 11, 2017, 236 pages.
PCT International Search Report and Written Opinion issued in International Application No. PCT/CN2016/100394 dated Jun. 21, 2017, 18 pages.

\* cited by examiner

US 10,567,203 B2

CHANNEL PARAMETER ESTIMATION METHOD AND RELATED APPARATUS

CROSS-REFERENCE TO RELATED APPLICATIONS

This application is a continuation of International Application No. PCT/CN2016/100394, filed on Sep. 27, 2016, the disclosure of which is hereby incorporated by reference in its entirety.

TECHNICAL FIELD

The present invention relates to the field of communications technologies, and in particular, to a channel parameter estimation method and a related apparatus.

BACKGROUND

Currently, in the coaxial access field, data is transmitted between a cable modem termination system (CMTS) and a cable modem (CM) through an uplink channel and a downlink channel.

In the coaxial access field, a mainly used standard is the data over cable service interface specification (DOCSIS) 3.1. Based on the DOCSIS 3.1, a full-duplex standard data over cable service interface specification (full duplex DOCSIS) is provided. According to the full duplex DOCSIS, a co-time co-frequency full duplex (CCFD) communication manner is used on a CMTS side, and a time division duplex (TDD) or frequency division duplex (FDD) communication manner is used on a CM side. In this case, particular bandwidth is allocated to the CM to serve as an uplink channel or a downlink channel. The CM needs to demodulate data received through the downlink channel before identifying and using the data, and the demodulation needs a channel parameter of the downlink channel.

According to the DOCSIS 3.1, in a conventional channel parameter estimation manner, a data frame sent by the CMTS to the CM through the downlink channel carries a discrete pilot signal, and the CM may estimate the channel parameter of the downlink channel based on the discrete pilot signal in the received data frame. However, the CM needs to receive at least one complete data frame, so that the CM can obtain sufficient discrete pilot signals from the data frame, to estimate the channel parameter of the downlink channel. Before estimating the channel parameter of the downlink channel, the CM cannot correctly demodulate data received through the downlink channel. It can be learned that according to the DOCSIS 3.1, a time for obtaining at least one data frame needs to be consumed from starting to estimate the channel parameter of the downlink channel by the CM to estimating the channel parameter by the CM. Consequently, the time required by the channel parameter estimation is relatively long, and time efficiency of bandwidth allocation is affected.

SUMMARY

A technical problem to be resolved in embodiments of the present invention is to provide a channel parameter estimation method and a related apparatus.

According to a first aspect, the present invention provides a channel parameter estimation method. The method includes:

obtaining, by a CM, a second data frame through a downlink channel, where the second data frame is generated after a first data frame sent by a CMTS is modulated through the downlink channel, the downlink channel is a downlink channel between the CM and the CMTS, the first data frame includes a zero-bit-loaded symbol, all codewords included in the zero-bit-loaded symbol of the first data frame are idle codewords, a zero-bit-loaded NCP and an idle codeword identified by the zero-bit-loaded NCP are set in the zero-bit-loaded symbol of the first data frame, and a data sequence used for channel parameter estimation is filled in the idle codeword;

obtaining, by the CM, a zero-bit-loaded symbol of the second data frame; and estimating, by the CM, a channel parameter of the downlink channel based on the data sequence filled in the zero-bit-loaded symbol of the first data frame and a data sequence filled in the zero-bit-loaded symbol of the second data frame.

It can be learned that the CM obtains the second data frame through the downlink channel between the CM and the CMTS, the second data frame is generated after the first data frame sent by the CMTS is modulated through the downlink channel, the first data frame includes the zero-bit-loaded symbol, the zero-bit-loaded symbol of the first data frame includes no valid codeword, but includes the zero-bit-loaded NCP and the idle codeword identified by the zero-bit-loaded NCP, and the idle codeword has the data sequence used for channel parameter estimation. When obtaining the zero-bit-loaded symbol of the second data frame from the second data frame through the downlink channel, the CM can estimate the channel parameter of the downlink channel based on the data sequence in the zero-bit-loaded symbol of the second data frame and the data sequence in the zero-bit-loaded symbol of the first data frame. Only a time for obtaining a symbol needs to be consumed from starting to estimate the channel parameter of the downlink channel by the CM to estimating the channel parameter by the CM. Therefore, the time consumed by the channel parameter estimation is shortened, and time efficiency of bandwidth allocation is improved.

In a first possible implementation of the first aspect, the obtaining, by a CM, a second data frame through a downlink channel includes:

obtaining, by the CM, the second data frame after an uplink channel between the CM and the CMTS is switched to the downlink channel.

It can be learned that, when the uplink channel is switched to the downlink channel, if the CM can obtain the second data frame obtained after the first data frame is modulated, the channel parameter of the downlink channel can be rapidly estimated by using the second data frame, thereby improving time efficiency of spectrum allocation.

With reference to the first possible implementation of the first aspect, in a second possible implementation, the second data frame is an initial data frame obtained by the CM through the downlink channel.

It can be learned that, when the second data frame is the initial data frame obtained by the CM through the downlink channel, a speed at which the CM estimates the channel parameter of the downlink channel can be further increased.

In a third possible implementation of the first aspect, time domain interleaving has been performed on symbols in the second data frame, and the obtaining, by the CM, a zero-bit-loaded symbol of the second data frame includes:

performing, by the CM, time domain de-interleaving on the second data frame, to form the zero-bit-loaded symbol of the second data frame.

It can be learned that the CM can obtain the required zero-bit-loaded symbol of the second data frame through the time domain de-interleaving, thereby correctly estimating the channel parameter of the downlink channel.

In a fourth possible implementation of the first aspect, the CM determines the zero-bit-loaded symbol of the first data frame.

With reference to the fourth possible implementation of the first aspect, in a fifth possible implementation, the data sequence filled in the idle codeword is filled by a significant bit in a scrambler based on a cyclic sequence used by the scrambler, and the determining, by the CM, the zero-bit-loaded symbol of the first data frame includes:

determining, by the CM based on a location of the zero-bit-loaded symbol of the second data frame in the second data frame, the cyclic sequence used by the scrambler to fill the significant bit in the idle codeword; and determining, by the CM, the zero-bit-loaded symbol of the first data frame based on the cyclic sequence.

It can be learned that the CM can determine, in a more targeted manner, the zero-bit-loaded symbol of the first data frame based on a manner of filling the data sequence by the CMTS, thereby correctly estimating the channel parameter of the downlink channel.

With reference to the fourth possible implementation of the first aspect, in a sixth possible implementation, the data sequence filled in the idle codeword is a fixed sequence, and the determining, by the CM, the zero-bit-loaded symbol of the first data frame includes:

determining, by the CM, the zero-bit-loaded symbol of the first data frame based on the fixed sequence.

It can be learned that the CM can determine, in a more targeted manner, the zero-bit-loaded symbol of the first data frame based on a manner of filling the data sequence by the CMTS, thereby correctly estimating the channel parameter of the downlink channel.

With reference to the first aspect or the first or the second or the third or the fourth or the fifth possible implementation of the first aspect, in a seventh possible implementation, after the estimating, by the CM, a channel parameter of the downlink channel based on the data sequence filled in the zero-bit-loaded symbol of the first data frame and a data sequence filled in the zero-bit-loaded symbol of the second data frame, the method further includes:

determining, by the CM based on two neighboring estimated channel parameters, a channel parameter used to demodulate a data frame on the downlink channel.

It can be learned that the channel parameter can be adjusted in a more targeted manner for a case such as a sudden change of the downlink channel, thereby improving accuracy of the channel parameter.

According to a second aspect, the present invention provides a channel parameter estimation method. The method includes:

setting, by a CMTS, a symbol in a first data frame as a zero-bit-loaded symbol, where all codewords included in the zero-bit-loaded symbol of the first data frame are idle codewords, a zero-bit-loaded NCP and an idle codeword identified by the zero-bit-loaded NCP are set in the zero-bit-loaded symbol of the first data frame, and a data sequence used for channel parameter estimation is filled in the idle codeword; and sending, by the CMTS, the first data frame to a CM through a downlink channel between the CMTS and the CM.

It can be learned that the CMTS sets the first data frame, the first data frame includes the zero-bit-loaded symbol, the zero-bit-loaded symbol of the first data frame includes no valid codeword, but includes the zero-bit-loaded NCP and the idle codeword identified by the zero-bit-loaded NCP, and the idle codeword has the data sequence used for channel parameter estimation, so that when the CM obtains, through the downlink channel between the CM and the CMTS, a second data frame generated after the first data frame is modulated through the downlink channel, if the CM can obtain a zero-bit-loaded symbol of the second data frame from the second data frame through the downlink channel, the CM can estimate a channel parameter of the downlink channel based on a data sequence in the zero-bit-loaded symbol of the second data frame and the data sequence in the zero-bit-loaded symbol of the first data frame. Only a time for obtaining a symbol needs to be consumed from starting to estimate the channel parameter of the downlink channel by the CM to estimating the channel parameter by the CM. Therefore, the time consumed by the channel parameter estimation is shortened, and time efficiency of bandwidth allocation is improved.

In a first possible implementation of the second aspect, the sending, by the CMTS, the first data frame to a CM through a downlink channel between the CMTS and the CM includes:

after an uplink channel between the CM and the CMTS is switched to the downlink channel, sending, by the CMTS, the first data frame to the CM through the downlink channel.

It can be learned that, when the uplink channel is switched to the downlink channel, if the CMTS can send the first data frame to the CM, the CM can rapidly estimate the channel parameter of the downlink channel by using the second data frame, thereby improving time efficiency of spectrum allocation.

With reference to the first possible implementation of the second aspect, in a second possible implementation, after the uplink channel between the CM and the CMTS is switched to the downlink channel, an initial data frame sent by the CMTS to the CM through the downlink channel is the first data frame.

It can be learned that, when the first data frame is the initial data frame sent by the CMTS through the downlink channel, a speed at which the CM estimates the channel parameter of the downlink channel can be further increased.

In a third possible implementation of the second aspect, the CMTS sends the first data frame to the CM through the downlink channel at a fixed period interval.

It can be learned that the channel parameter can be adjusted in a more targeted manner for a case such as a sudden change of the downlink channel, thereby improving accuracy of the channel parameter.

With reference to the second aspect or the first or the second or the third possible implementation of the second aspect, in a fourth possible implementation, the data sequence filled in the idle codeword is filled by a significant bit in a scrambler based on a cyclic sequence used by the scrambler.

It can be learned that the CMTS can pre-negotiate a manner of filling the data sequence with the CM.

With reference to the second aspect or the first or the second or the third possible implementation of the second aspect, in a fifth possible implementation, the data sequence filled in the idle codeword is a fixed sequence.

It can be learned that the CMTS can pre-negotiate a manner of filling the data sequence with the CM.

According to a third aspect, the present invention provides a cable modem. The CM includes an obtaining unit, a determining unit, and an estimation unit, where the obtaining unit is configured to obtain a second data frame through a downlink channel, where the second data frame is generated after a first data frame sent by a CMTS is modulated through the downlink channel, the downlink channel is a downlink channel between the CM and the CMTS, the first data frame includes a zero-bit-loaded symbol, all codewords included in the zero-bit-loaded symbol of the first data frame are idle codewords, a zero-bit-loaded NCP and an idle codeword identified by the zero-bit-loaded NCP are set in the zero-bit-loaded symbol of the first data frame, and a data sequence used for channel parameter estimation is filled in the idle codeword;

the obtaining unit is further configured to obtain a zero-bit-loaded symbol of the second data frame; and the estimation unit is configured to estimate a channel parameter of the downlink channel based on the data sequence filled in the zero-bit-loaded symbol of the first data frame and a data sequence filled in the zero-bit-loaded symbol of the second data frame.

It can be learned that the CM obtains the second data frame through the downlink channel between the CM and the CMTS, the second data frame is generated after the first data frame sent by the CMTS is modulated through the downlink channel, the first data frame includes the zero-bit-loaded symbol, the zero-bit-loaded symbol of the first data frame includes no valid codeword, but includes the zero-bit-loaded NCP and the idle codeword identified by the zero-bit-loaded NCP, and the idle codeword has the data sequence used for channel parameter estimation. When obtaining the zero-bit-loaded symbol of the second data frame from the second data frame through the downlink channel, the CM can estimate the channel parameter of the downlink channel based on the data sequence in the zero-bit-loaded symbol of the second data frame and the data sequence in the zero-bit-loaded symbol of the first data frame. Only a time for obtaining a symbol needs to be consumed from starting to estimate the channel parameter of the downlink channel by the CM to estimating the channel parameter by the CM. Therefore, the time consumed by the channel parameter estimation is shortened, and time efficiency of bandwidth allocation is improved.

In a first possible implementation of the third aspect, the obtaining unit is further configured to obtain the second data frame after an uplink channel between the CM and the CMTS is switched to the downlink channel.

It can be learned that, when the uplink channel is switched to the downlink channel, if the CM can obtain the second data frame obtained after the first data frame is modulated, the channel parameter of the downlink channel can be rapidly estimated by using the second data frame, thereby improving time efficiency of spectrum allocation.

With reference to the first possible implementation of the third aspect, in a second possible implementation, the second data frame is an initial data frame obtained by the CM through the downlink channel.

It can be learned that, when the second data frame is the initial data frame obtained by the CM through the downlink channel, a speed at which the CM estimates the channel parameter of the downlink channel can be further increased.

In a third possible implementation of the third aspect, time domain interleaving has been performed on symbols in the second data frame, and the obtaining unit is further configured to perform time domain de-interleaving on the second data frame, to form the zero-bit-loaded symbol of the second data frame.

It can be learned that the CM can obtain the required zero-bit-loaded symbol of the second data frame through the time domain de-interleaving, thereby correctly estimating the channel parameter of the downlink channel.

In a fourth possible implementation of the third aspect, the CM further includes a determining unit, where the determining unit is configured to determine the zero-bit-loaded symbol of the first data frame.

With reference to the fourth possible implementation of the third aspect, in a fifth possible implementation, the data sequence filled in the idle codeword is filled by a significant bit in a scrambler based on a cyclic sequence used by the scrambler, and the determining unit is further configured to: determine, based on a location of the modulated zero-bit-loaded symbol in the second data frame, the cyclic sequence used by the scrambler to fill the significant bit in the idle codeword; and determine the zero-bit-loaded symbol of the first data frame based on the cyclic sequence.

It can be learned that the CM can determine, in a more targeted manner, the zero-bit-loaded symbol of the first data frame based on a manner of filling the data sequence by the CMTS, thereby correctly estimating the channel parameter of the downlink channel.

With reference to the fourth possible implementation of the third aspect, in a sixth possible implementation, the data sequence filled in the idle codeword is a fixed sequence, and the determining unit is further configured to determine the zero-bit-loaded symbol of the first data frame based on the fixed sequence.

It can be learned that the CM can determine, in a more targeted manner, the zero-bit-loaded symbol of the first data frame based on a manner of filling the data sequence by the CMTS, thereby correctly estimating the channel parameter of the downlink channel.

With reference to the third aspect or the first, the second, the third, the fourth, or the fifth possible implementation of the third aspect, in a seventh possible implementation, the CM further includes a calculation unit, where the calculation unit is configured to determine, based on two neighboring estimated channel parameters, a channel parameter used to demodulate a data frame on the downlink channel.

It can be learned that the channel parameter can be adjusted in a more targeted manner for a case such as a sudden change of the downlink channel, thereby improving accuracy of the channel parameter.

According to a fourth aspect, the present invention provides a cable modem termination system. The CMTS includes a setting unit and a sending unit, where the setting unit is configured to set a symbol in a first data frame as a zero-bit-loaded symbol, where the zero-bit-loaded symbol of the first data frame includes no valid codeword, a zero-bit-loaded NCP and an idle codeword identified by the zero-bit-loaded NCP are set in the zero-bit-loaded symbol of the first data frame, and a data sequence used for channel parameter estimation is filled in the idle codeword; and the sending unit is configured to send the first data frame to a CM through a downlink channel between the CMTS and the CM.

It can be learned that the CMTS sets the first data frame, the first data frame includes the zero-bit-loaded symbol, the zero-bit-loaded symbol of the first data frame includes no valid codeword, but includes the zero-bit-loaded NCP and the idle codeword identified by the zero-bit-loaded NCP, and the idle codeword has the data sequence used for channel parameter estimation, so that when the CM obtains, through the downlink channel between the CM and the CMTS, a second data frame generated after the first data frame is modulated through the downlink channel, if the CM can obtain a zero-bit-loaded symbol of the second data frame from the second data frame through the downlink channel, the CM can estimate a channel parameter of the downlink channel based on a data sequence in the zero-bit-loaded symbol of the second data frame and the data sequence in the zero-bit-loaded symbol of the first data frame. Only a time for obtaining a symbol needs to be consumed from starting to estimate the channel parameter of the downlink channel by the CM to estimating the channel parameter by the CM. Therefore, the time consumed by the channel parameter estimation is shortened, and time efficiency of bandwidth allocation is improved.

In a first possible implementation of the fourth aspect, after an uplink channel between the CM and the CMTS is switched to the downlink channel, the sending unit is further configured to send the first data frame to the CM through the downlink channel.

It can be learned that, when the uplink channel is switched to the downlink channel, if the CMTS can send the first data frame to the CM, the CM can rapidly estimate the channel parameter of the downlink channel by using the second data frame, thereby improving time efficiency of spectrum allocation.

With reference to the first possible implementation of the fourth aspect, in a second possible implementation, after the uplink channel between the CM and the CMTS is switched to the downlink channel, an initial data frame sent by the sending unit to the CM through the downlink channel is the first data frame.

It can be learned that, when the first data frame is the initial data frame sent by the CMTS through the downlink channel, a speed at which the CM estimates the channel parameter of the downlink channel can be further increased.

In a third possible implementation of the fourth aspect, the sending unit is further configured to send the first data frame to the CM through the downlink channel at a fixed period interval.

It can be learned that the channel parameter can be adjusted in a more targeted manner for a case such as a sudden change of the downlink channel, thereby improving accuracy of the channel parameter.

With reference to the fourth aspect or the first or the second or the third possible implementation of the fourth aspect, in a fourth possible implementation, the data sequence filled in the idle codeword is filled by a significant bit in a scrambler based on a cyclic sequence used by the scrambler.

It can be learned that the CMTS can pre-negotiate a manner of filling the data sequence with the CM.

With reference to the fourth aspect or the first or the second or the third possible implementation of the fourth aspect, in a fifth possible implementation, the data sequence filled in the idle codeword is a fixed sequence.

It can be learned that the CMTS can pre-negotiate a manner of filling the data sequence with the CM.

According to a fifth aspect, the present invention provides a channel parameter estimation system. The channel parameter estimation system includes a CM and a CMTS, where the CM is configured to: obtain a second data frame through a downlink channel, where the second data frame is generated after a first data frame sent by the CMTS is modulated through the downlink channel, the downlink channel is a downlink channel between the CM and the CMTS, the first data frame includes a zero-bit-loaded symbol, all codewords included in the zero-bit-loaded symbol of the first data frame are idle codewords, a zero-bit-loaded NCP and an idle codeword identified by the zero-bit-loaded NCP are set in the zero-bit-loaded symbol of the first data frame, and a data sequence used for channel parameter estimation is filled in the idle codeword; obtain a zero-bit-loaded symbol of the second data frame; and estimate a channel parameter of the downlink channel based on the data sequence filled in the zero-bit-loaded symbol of the first data frame and a data sequence filled in the zero-bit-loaded symbol of the second data frame; and the CMTS is configured to: set a symbol in the first data frame as a zero-bit-loaded symbol; and send the first data frame to the CM through the downlink channel between the CMTS and the CM.

It can be learned from the foregoing technical solutions that, the CM obtains the second data frame through the downlink channel between the CM and the CMTS, the second data frame is generated after the first data frame sent by the CMTS is modulated through the downlink channel, the first data frame includes the zero-bit-loaded symbol, the zero-bit-loaded symbol of the first data frame includes no valid codeword, but includes the zero-bit-loaded NCP and the idle codeword identified by the zero-bit-loaded NCP, and the idle codeword has the data sequence used for channel parameter estimation. When obtaining the zero-bit-loaded symbol of the second data frame from the second data frame through the downlink channel, the CM can estimate the channel parameter of the downlink channel based on the data sequence in the zero-bit-loaded symbol of the second data frame and the data sequence in the zero-bit-loaded symbol of the first data frame. Only a time for obtaining a symbol needs to be consumed from starting to estimate the channel parameter of the downlink channel by the CM to estimating the channel parameter by the CM. Therefore, the time consumed by the channel parameter estimation is shortened, and time efficiency of bandwidth allocation is improved.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

The communications field mainly includes TDD, FDD, and CCFD. Based on the DOCSIS 3.1, a full duplex DOCSIS standard is provided. According to the standard, a CCFD communication manner is used on a CMTS side, and a TDD or FDD communication manner is used on a CM side. A configuration on the CM side is described by using the FDD as an example. On the CM side, all CMs may be grouped based on an interference relationship (which may also be referred to as an isolation degree) of the CMs. Specifically, CMs in which mutual interference exists or whose mutual interference does not satisfy a requirement are grouped, and the FDD is implemented in intra-group CMs. CMs in which no mutual interference exists or whose mutual interference satisfies the requirement are grouped into different groups. The CCFD is implemented between the groups, to improve spectrum efficiency.

For ease of understanding, an example of a diagram of a system architecture of a cable communications system that can implement a method in the embodiments of the present invention is described from an overall perspective. It should be understood that, embodiments of the present invention are not limited to applying to the system architecture shown in FIG. 1. In addition, an apparatus in FIG. 1 may be hardware, or may be software obtained through division based on functions, or may be of a structure having hardware and software.

Figure 1:
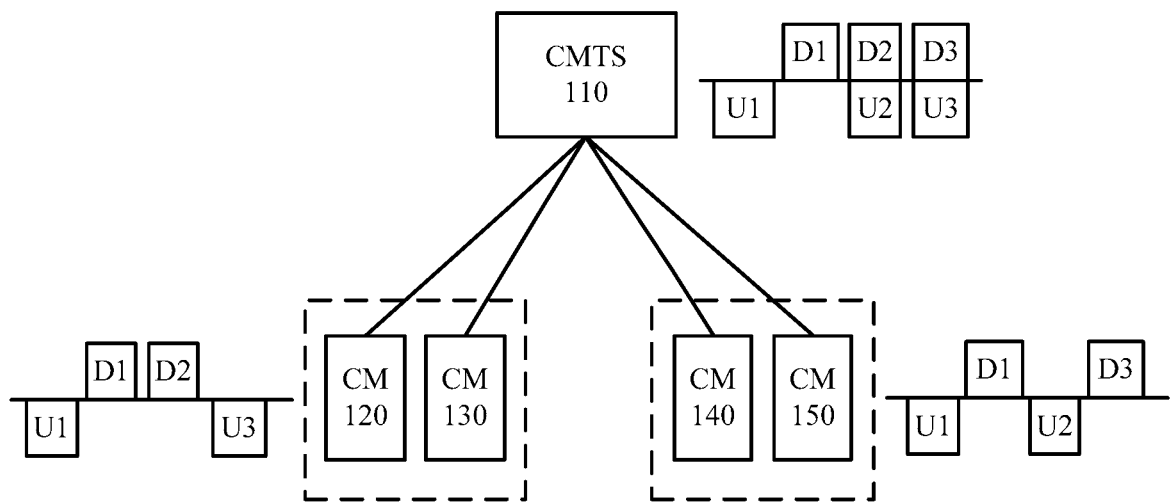
FIG. 1 is an example of a diagram of a system architecture of a cable communications system according to an embodiment of the present invention.

The system shown in FIG. 1 includes a CMTS 110, a CM 120, a CM 130, a CM 140, and a CM 150. It should be noted that a quantity of CMTSs and a quantity of CMs in FIG. 1 should not constitute a limitation on the present invention. The CMTS 110, the CM 120, the CM 130, the CM 140, and the CM 150 may conform to the conventional DOCSIS 3.1.

Data is transmitted between the CMTS and the CM through an uplink channel and a downlink channel. A signal transmission direction from the CMTS to the CM is referred to as a downlink direction, and data from the CMTS to the CM is transmitted through the downlink channel. A signal transmission direction from the CM to the CMTS is referred to as an uplink direction, and data from the CM to the CMTS is transmitted through the uplink channel.

The CMTS is a device that manages and controls the CM. The CMTS may be configured by using a console interface or an Ethernet interface, and configuration content of the CMTS mainly includes a downlink frequency, a downlink modulation scheme, a downlink level, and the like. A modulation scheme should be selected by considering channel transmission quality. In addition, Internet Protocol (IP) addresses of a Dynamic Host Configuration Protocol (DHCP) server and a Trivial File Transfer Protocol (TFTP) server, an IP address of the CMTS, and the like need to be set. After the foregoing settings are complete, if an intermediate line is not faulty and signal level attenuation satisfies a requirement, the DHCP server and the TFTP server are started, so that a normal communication channel can be established between a front end and the CM.

The CM is a device used to access the Internet on a cable television network (namely, a cable network). The CM is serially connected between a cable television cable socket and an Internet access device in a user home, and the other end connected to the CM by using the cable television network is a cable television broadcast station.

A working mode of the CMTS 110 is CCFD. As shown in FIG. 1, the CMTS 110 may send downlink signals by separately using channels occupying a D1 spectrum, a D2 spectrum, and a D3 spectrum, and may receive uplink signals sent by using channels occupying a U1 spectrum, a U2 spectrum, and a U3 spectrum. The D2 spectrum and the U2 spectrum overlap, and the D3 spectrum and the U3 spectrum overlap. The CMTS may send signals to all the CMs at a same power or different powers, and the CMTS may receive, at a same power or different powers, signals sent by the CM.

The CM 120, the CM 130, the CM 140, and the CM 150 still remain uplink and downlink frequency division, namely, FDD. The CM 120, the CM 130, the CM 140, and the CM 150 need to be grouped based on an interfered degree (which may also be referred to as interference seriousness or a mutual isolation degree). For example, the CM 120 and the CM 130 are in a same group. The CM 120 and the CM 130 may send uplink signals by using the channels occupying the U1 spectrum and the U3 spectrum, and may receive downlink signals sent by using the channels occupying the D1 spectrum and the D2 spectrum. The U1 spectrum, the U3 spectrum, the D1 spectrum, and the D2 spectrum do not overlap.

The CM 140 and the CM 150 are in a same group. The CM 140 and the CM 150 may send uplink signals by using the channels occupying the U1 spectrum and the U2 spectrum, and may receive downlink signals sent by using the channels occupying the D1 spectrum and the D3 spectrum. The U1 spectrum, the U2 spectrum, the D1 spectrum, and the D3 spectrum do not overlap.

Using the CM 120 as an example, a downlink channel (which is referred to as a downlink channel 1 for short below) occupying the D1 spectrum and a downlink channel occupying the D2 spectrum exist between the CM 120 and the CMTS 110. If the CM 120 receives, through the downlink channel 1, a second data frame sent by the CMTS 110, because a first data frame sent by the CMTS 110 through the downlink channel 1 is modulated through the downlink channel 1, the CM 120 receives, through the downlink channel 1, the second data frame generated after the first data frame is modulated. The CM 120 needs to demodulate the second data frame, to restore the first data frame sent by the CMTS 110. The CM 120 demodulates, by using a channel parameter of the downlink channel 1, the second data frame received through the downlink channel 1, and the channel parameter of the downlink channel 1 needs to be estimated by the CM 120.

In a channel parameter estimation manner stipulated in the DOCSIS 3.1, the first data frame sent by the CMTS to the CM through the downlink channel carries a discrete pilot signal, and the CM may obtain the discrete pilot signal from the second data frame, to estimate the channel parameter of the downlink channel.

At least a time for receiving a data frame through the downlink channel by the CM is required from starting to estimate the channel parameter of the downlink channel based on the discrete pilot signal by the CM to estimating the channel parameter by the CM. It can be learned from the DOCSIS 3.1 that the time required by estimating the channel parameter by the CM is relatively long, and time efficiency of bandwidth allocation is affected.

Therefore, embodiments of the present invention provide a channel parameter estimation method and a related apparatus. A CM obtains a second data frame through a downlink channel between the CM and a CMTS. The second data frame is generated after a first data frame sent by the CMTS is modulated through the downlink channel, the first data frame includes a zero-bit-loaded symbol, the zero-bit-loaded symbol of the first data frame includes no valid codeword, but includes a zero-bit-loaded next codeword pointer (NCP) and an idle codeword identified by the zero-bit-loaded NCP, and the idle codeword includes a data sequence used for channel parameter estimation. When obtaining a zero-bit-loaded symbol of the second data frame from the second data frame through the downlink channel, the CM can estimate a channel parameter of the downlink channel based on a data sequence in the zero-bit-loaded symbol of the second data frame and the data sequence in the zero-bit-loaded symbol of the first data frame. Only a time for obtaining a symbol needs to be consumed from starting to estimate the channel parameter of the downlink channel by the CM to estimating the channel parameter by the CM. Therefore, the time consumed by the channel parameter estimation is shortened, and time efficiency of bandwidth allocation is improved.

Figure 2:
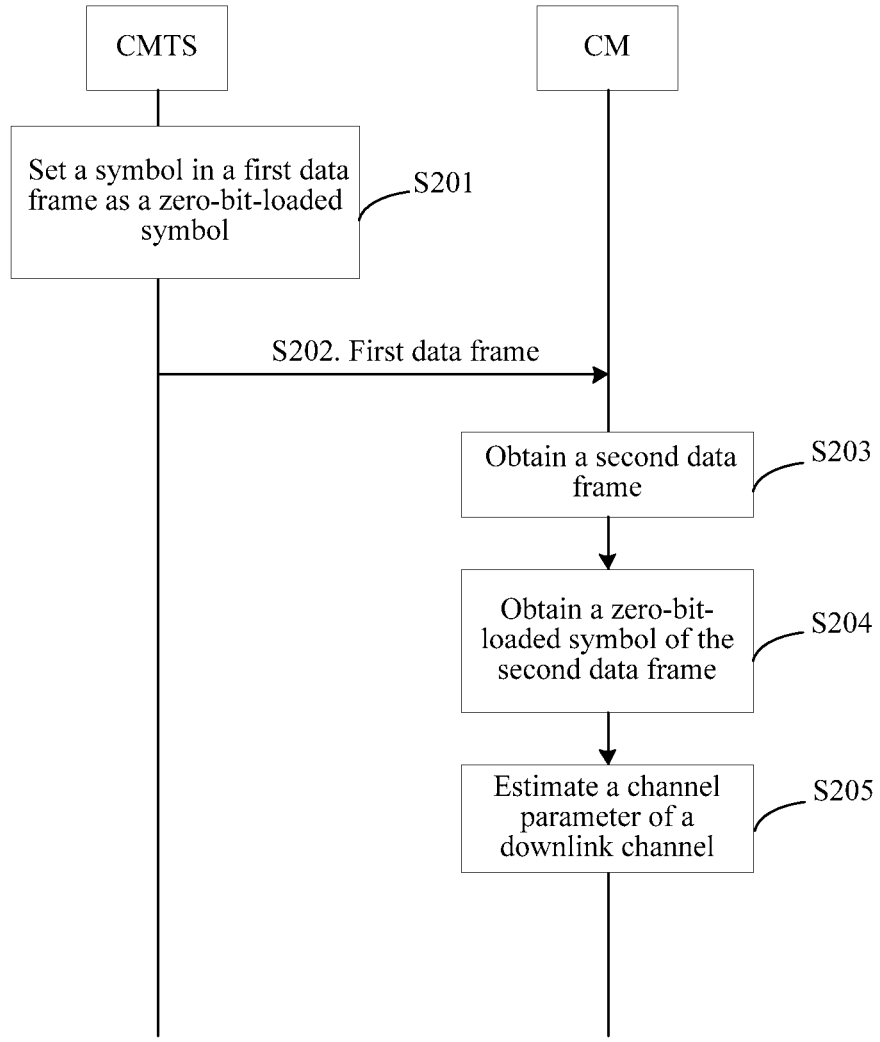
FIG. 2 is a signalling flowchart of a channel parameter estimation method according to an embodiment of the present invention.

FIG. 2 is a signalling flowchart of a channel parameter estimation method according to an embodiment of the present invention.

S201: A CMTS sets a symbol in a first data frame as a zero-bit-loaded symbol.

The first data frame may include a plurality of symbols. For example, in a cable communications system, a data frame may include 128 symbols. In this embodiment of the present invention, any symbol in the first data frame may be set as a zero-bit-loaded symbol. Different from other symbols in the first data frame, the zero-bit-loaded symbol of the first data frame mainly includes a zero-bit-loaded NCP and an idle codeword. The entire zero-bit-loaded symbol may be indicated by using the zero-bit-loaded NCP, to indicate that the idle codeword is filled in the zero-bit-loaded symbol of the first data frame, and no valid codeword is included. The zero-bit-loaded NCP is further used to identify a start location from which the zero-bit-loaded symbol of the first data frame is filled by the idle codeword. Because the zero-bit-loaded symbol of the first data frame includes no valid codeword, the zero-bit-loaded symbol of the first data frame starts to be filled by the idle codeword, and all codewords included in the zero-bit-loaded symbol of the first data frame are idle codewords.

The valid codeword carries valid data. For example, in an RS-FEC (528, 514) algorithm scenario, a valid codeword has a size of 5280 bits (bit). However, the idle codeword is not a conventional codeword, the idle codeword may be a data block or a code block including an unused subcarrier and/or a zero-bit-loaded subcarrier, and the idle codeword carries no valid data. A downlink channel between the CMTS and a CM is mainly used for data transmission, and a main objective of the data transmission is that a receiver (namely, the CM) transmits data (to be specific, the valid data in the present invention) that is not known to the CM. The CM cannot pre-learn of data filled in the valid codeword. Therefore, the valid codeword carries valid data. However, data in a data sequence filled in the idle codeword is pre-negotiated by the CMTS and the CM, to be specific, the data is data already pre-learned of by the CM. Therefore, the idle codeword carries no valid data, or the carried data is "invalid data" different from the valid data in the present invention, to be specific, data that can be pre-learned of by the CM without needing to be transmitted.

The zero-bit-loaded symbol carries no valid codeword; otherwise, a result for channel parameter estimation performed by the CM is affected. If the zero-bit-loaded symbol carries valid data, because a valid codeword carries valid data, before estimating the channel parameter, the CM cannot determine the valid codeword filled by the CMTS. To be specific, even if the CM obtains a zero-bit-loaded symbol of a second data frame, the CM cannot learn of content of a frequency band in which the valid codeword is carried before modulation. Therefore, the CM cannot estimate some channel parameters corresponding to the frequency band used to carry the valid codeword in the zero-bit-loaded symbol.

Figure 3:
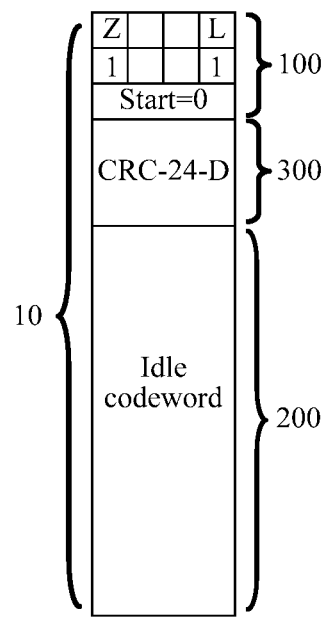
FIG. 3 is a schematic composition diagram of a zero-bit-loaded symbol according to an embodiment of the present invention.

FIG. 3 shows a possible structure of a zero-bit-loaded symbol 10. The zero-bit-loaded symbol 10 includes a zero-bit-loaded NCP 100, an idle codeword 200, and a cyclic redundancy check (CRC)-24-D300. The zero-bit-loaded NCP 100 is used to identify a start location from which the zero-bit-loaded symbol is filled by the idle codeword 200. Because the zero-bit-loaded symbol 10 includes only one idle codeword, the zero-bit-loaded symbol 10 starts to be filled by the idle codeword. In the zero-bit-loaded NCP, the start location is identified by using "start location=0" (start=0). In the zero-bit-loaded NCP, a value of a flag bit Z is 1, identifying that a subcarrier in the idle codeword 200 is an unused subcarrier and/or a zero-bit-loaded subcarrier. The CRC-24-D300 may be understood as an NCP that provides a function of checking the zero-bit-loaded NCP.

To enable the zero-bit-loaded symbol to have a function of estimating the channel parameter, a data sequence used for channel parameter estimation may be filled in the idle codeword. The data sequence may be data filled by a preset sequence in the idle codeword.

The preset sequence may identify a location of a subcarrier in which the data is filled in the idle codeword. The preset sequence used to fill the data in the idle codeword may be a random sequence, and the preset sequence is pre-negotiated by the CMTS and the CM and is a sequence known to the CMTS and the CM. The filled data may be understood as quadrature amplitude modulation (QAM) random data. For example, the filled data may be a least significant bit of a scrambler on a CMTS side, or a fixed random sequence filled based on the location of the subcarrier in the idle codeword. The data filled by the CMTS in the idle codeword is pre-negotiated with the CM, and the CM can pre-learn of the data filled by the CMTS in the idle codeword before estimating the channel parameter of the downlink channel.

S202: The CMTS sends the first data frame to a CM through a downlink channel between the CMTS and the CM.

Figure 4:
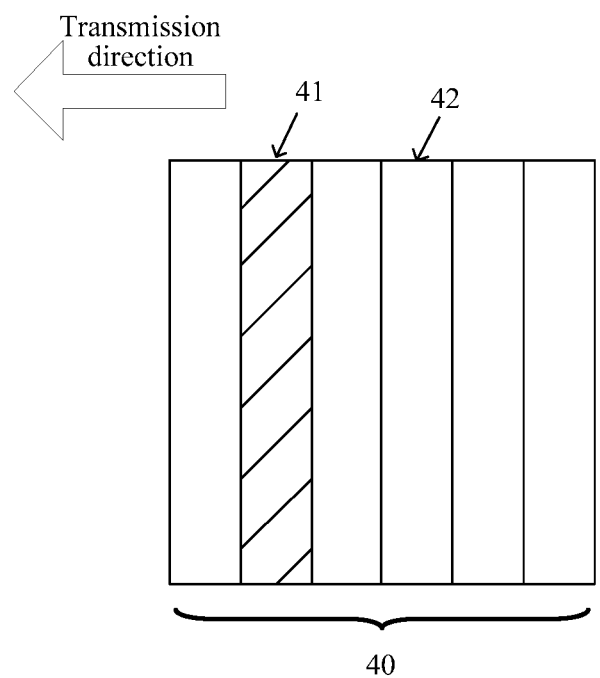
FIG. 4 is a schematic composition diagram of a first data frame according to an embodiment of the present invention.

For example, the first data frame that includes the zero-bit-loaded symbol and that is sent by the CMTS to the CM may be shown in FIG. 4. A first data frame 40 shown in FIG. 4 includes a zero-bit-loaded symbol 41 and other symbols 42. For ease of representation, the first data frame 40 shown in FIG. 4 includes six symbols. It should be noted that a quantity of zero-bit-loaded symbols included in the data frame is not limited in the present invention. There may be one or more zero-bit-loaded symbols. When the first data frame includes a plurality of zero-bit-loaded symbols, some or all of the plurality of zero-bit-loaded symbols in the first data frame are neighboring to each other, or all of the plurality of zero-bit-loaded symbols in the first data frame are not neighboring to each other.

FIG. 4 shows only a possible location of the zero-bit-loaded symbol 41 in the first data frame 40. In some cases, the zero-bit-loaded symbol 41 may be disposed at a front location along a transmission direction, for example, on a leftmost side in FIG. 4, so that the CM can obtain the zero-bit-loaded symbol 41 relatively early.

S203: The CM obtains a second data frame through the downlink channel, where the second data frame is generated after the first data frame sent by the CMTS is modulated through the downlink channel.

The downlink channel is an analog channel. During data transmission on the downlink channel, to-be-transmitted data is modulated based on a channel parameter of the downlink channel, to convert the to-be-transmitted data into an analog signal, so that the data is more appropriately transmitted on the analog channel.

Figure 5:
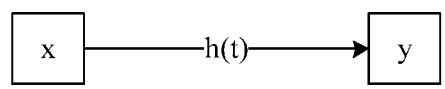
FIG. 5 is a schematic diagram of modulating a data frame through a downlink channel according to an embodiment of the present invention.

The meaning of the modulation is clarified below with reference to the accompanying drawings. Referring to FIG. 5, a data frame x is a data frame sent by the CMTS to the CM through the downlink channel. During a transmission process on the downlink channel, the data frame x is modulated. The modulation herein may be understood as impact of the downlink channel on the data frame x. The channel parameter used for the modulation on the downlink channel may be h(t), so that the CM receives a data frame y obtained after modulation is performed on the data frame x by using h(t), instead of receiving the data frame x. However, to obtain the data frame x, the CM needs to perform channel parameter estimation, to determine h(t), so that the CM demodulates the received data frame y by using h(t), to restore the data frame x. The data frame x herein may be the first data frame in S201, and the data frame y may be the second data frame in S203.

Therefore, in a process of transmitting, through the downlink channel, the first data frame sent by the CMTS, the second data frame is obtained by modulating the first data frame through the downlink channel, so that the CM obtains the second data frame through the downlink channel.

S204: The CM obtains a zero-bit-loaded symbol of the second data frame.

The entire zero-bit-loaded symbol includes no valid codeword, so that the CM can clearly identify the zero-bit-loaded symbol of the second data frame from symbols included in the second data frame, to obtain the zero-bit-loaded symbol of the second data frame from the second data frame. Usually, a time required for obtaining the zero-bit-loaded symbol of the second data frame by the CM is substantially equivalent to a time required for receiving a symbol by the CM.

Figure 6:
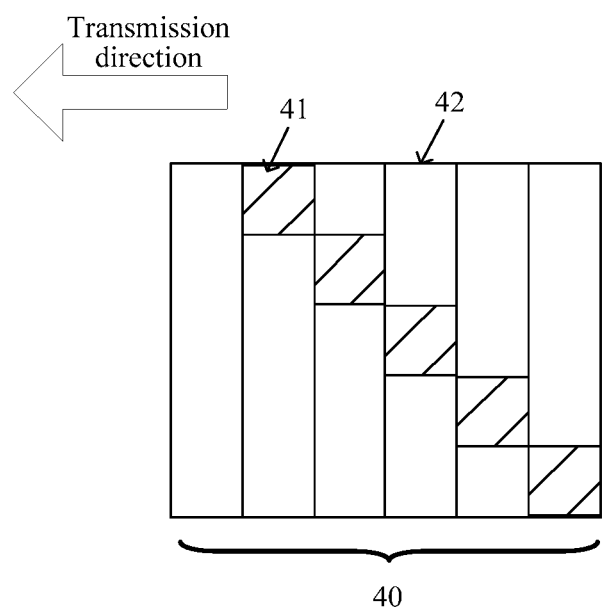
FIG. 6 is a schematic composition diagram of a first data frame obtained after time domain interleaving has been performed on the first data frame shown in FIG. 4 according to an embodiment of the present invention.

However, in some cases, when a data frame is transmitted through the downlink channel, time domain interleaving needs to be performed on the data frame. Through the time domain interleaving, times at which subcarriers included in a symbol of the data frame reach a receive end (for example, the CM) are different. FIG. 6 shows a structure of a first data frame obtained after time domain interleaving. FIG. 6 shows a structure of a first data frame obtained after time domain interleaving has been performed on the first data frame shown in FIG. 4. It can be learned that subcarriers in the zero-bit-loaded symbol 41 are interleaved into other symbols.

If the time domain interleaving has been performed on the first data frame, the CM needs to perform time domain de-interleaving on the received second data frame, to re-form the zero-bit-loaded symbol of the second data frame. In this case, the time required for obtaining the zero-bit-loaded symbol of the second data frame by the CM is relatively long. Usually, a time for obtaining n symbols needs to be consumed to obtain the zero-bit-loaded symbol of the second data frame. A value of n is the same as a depth of the time domain interleaving. The depth of the time domain interleaving is used to identify that through the time domain interleaving, subcarriers in a symbol are interleaved to several symbols. Using FIG. 6 as an example, it may be considered that the depth of the time domain interleaving performed on the data frame in FIG. 4 is 5.

The CM obtains the zero-bit-loaded symbol of the second data frame, so that the CM can determine a data sequence (which is referred to as a modulated data sequence for short below) in an idle codeword in the zero-bit-loaded symbol of the second data frame. The modulated data sequence is a data sequence obtained by modulating, through the downlink channel, the data sequence set by the CMTS in the idle codeword in the zero-bit-loaded symbol. Therefore, usually, the modulated data sequence is different from the data sequence in S201.

S205: The CM estimates a channel parameter of the downlink channel based on a data sequence filled in the zero-bit-loaded symbol of the first data frame and a data sequence filled in the zero-bit-loaded symbol of the second data frame.

The CM can determine the zero-bit-loaded symbol of the first data frame, and the zero-bit-loaded symbol of the first data frame is equivalent to content that is not modulated through the downlink channel. The zero-bit-loaded symbol of the second data frame determined by using S204 is equivalent to content obtained after modulating the zero-bit-loaded symbol of the first data frame through the downlink channel. Based on a difference between the zero-bit-loaded symbols before and after the modulation performed through the downlink channel, the channel parameter of the downlink channel can be estimated. An algorithm for estimating the channel parameter may be, for example, a least mean square or least square (LS) algorithm.

It can be learned that the CM obtains the second data frame through the downlink channel between the CM and the CMTS, the second data frame is generated after the first data frame sent by the CMTS is modulated through the downlink channel, the first data frame includes the zero-bit-loaded symbol, the zero-bit-loaded symbol of the first data frame includes no valid codeword, but includes the zero-bit-loaded NCP and the idle codeword identified by the zero-bit-loaded NCP, and the idle codeword has the data sequence used for channel parameter estimation. When obtaining the zero-bit-loaded symbol of the second data frame from the second data frame through the downlink channel, the CM can estimate the channel parameter of the downlink channel based on the data sequence in the zero-bit-loaded symbol of the second data frame and the data sequence in the zero-bit-loaded symbol of the first data frame. Only a time for obtaining a symbol needs to be consumed from starting to estimate the channel parameter of the downlink channel by the CM to estimating the channel parameter by the CM. Therefore, the time consumed by the channel parameter estimation is shortened, and time efficiency of bandwidth allocation is improved.

A manner of determining the zero-bit-loaded symbol of the first data frame by the CM is described below.

The data sequence filled by the CMTS in the idle codeword is a preset sequence pre-negotiated by the CMTS and the CM, and the preset sequence is a sequence known to the CMTS and the CM. Based on different manners of filling the data sequence in the idle codeword in the zero-bit-loaded symbol by the CMTS in S201, the CM may determine the zero-bit-loaded symbol of the first data frame in different corresponding manners.

Optionally, this embodiment of the present invention provides at least two manners of filling the data sequence used for channel parameter estimation in the idle codeword by the CMTS.

First Filling Manner:

In the DOCSIS3.1, binary phase shift keying (BPSK) modulation may be performed for an idle codeword including an unused subcarrier and/or a zero-bit-loaded subcarrier. On the CMTS side, the data sequence filled in the idle codeword by the CMTS is filled by a significant bit in a scrambler based on a cyclic sequence used by the scrambler, the cyclic sequence may be a random BPSK sequence, and the random BPSK sequence may be determined by using a constellation point obtained through BPSK modulation. The scrambler is a scrambler on the CMTS side. To reduce calculation difficulty of the channel parameter estimation, the filled data may be a least significant bit (LSB), to be specific, the lowest bit in the scrambler. An operation of filling the data sequence in the symbol based on the cyclic sequence of the scrambler may be understood as scrambling the symbol by the scrambler.

When the CMTS fills data in the idle codeword in this manner, although the CM obtains the cyclic sequence of the scrambler through pre-negotiation with the CMTS or another manner, the CM still needs to determine a sequence filled with data by the CMTS in the zero-bit-loaded symbol.

An update period of the cyclic sequence of the scrambler is related to a data frame. When the data frame includes 128 symbols, the cyclic sequence of the scrambler may also be updated every 128 symbols. To be specific, on the CMTS side, sequences filled by the scrambler in symbols in the first data frame are different. Based on such a characteristic, the CM may correspondingly determine a location of the zero-bit-loaded symbol in the first data frame by determining a location of the zero-bit-loaded symbol of the second data frame in the second data frame, to determine, from the cyclic sequence, a specific sequence filled by the scrambler in a significant bit in the idle codeword. Therefore, the CM determines the zero-bit-loaded symbol before modulation on the downlink channel, to be specific, the zero-bit-loaded symbol sent by the CMTS.

The CM needs to determine the location of the zero-bit-loaded symbol in the first data frame by obtaining the second data frame and the zero-bit-loaded symbol of the second data frame. Therefore, for the first filling manner of the CMTS, determining the zero-bit-loaded symbol of the first data frame needs to be performed after S204.

Second Filling Manner:

The CMTS fills data in the idle codeword by using a fixed sequence, to be specific, a location of a subcarrier in which the data needs to be filled in the idle codeword is fixed. The fixed sequence may be a fixed random sequence.

In this case, the CM may directly determine, based on a pre-obtained fixed sequence, the zero-bit-loaded symbol sent by the CMTS. A time in which the CM needs to first determine a location of the zero-bit-loaded symbol of the second data frame in the modulated data frame for the first filling manner is reduced, thereby improving efficiency.

For the second filling manner of the CMTS, the CM does not need to obtain the second data frame and use the second data frame as a basis for determining the first data frame sent by the CMTS. Therefore, determining the zero-bit-loaded symbol of the first data frame may be performed after S204, or may be performed before S204.

After determining the channel parameter of the downlink channel, the CM can demodulate the data frame modulated through the downlink channel, to obtain the data frame sent by the CMTS.

The channel parameter used during the demodulation may be the channel parameter determined by using S206. In some cases, for example, a case in which an accuracy requirement for the channel parameter estimation is relatively high, accuracy of the channel parameter estimated by using one zero-bit-loaded symbol may not satisfy the requirement. For another example, after the channel parameter is estimated, the downlink channel suddenly changes. Consequently, the estimated channel parameter possibly cannot be used to accurately demodulate a data frame obtained through the downlink channel after the sudden change. Therefore, in addition to the fact that the channel parameter determined in S206 is directly used to demodulate the data frame obtained through the downlink channel, the CM may further determine, based on two neighboring estimated channel parameters, the channel parameter used to demodulate the data frame on the downlink channel.

It is clarified that one or more zero-bit-loaded symbols may be set in the data frame sent by the CMTS to the CM. Therefore, when a plurality of zero-bit-loaded symbols are set in the data frame, the CM may estimate a plurality of channel parameters based on the plurality of zero-bit-loaded symbols.

However, in the present invention, a quantity of data frames having a zero-bit-loaded symbol that are sent by the CMTS for estimating the channel parameter of the downlink channel is not limited. Optionally, the CMTS may send data frames having a zero-bit-loaded symbol to the CM through the downlink channel at a fixed period interval. The fixed period may be a fixed time interval, or may be a fixed data frame interval, or may be a fixed symbol interval. When the CMTS sends, at a fixed interval, data frames in which zero-bit-loaded symbols are set, the CM can also estimate a plurality of channel parameters.

It should be noted that in addition to the fact that the CMTS may send, at a fixed interval, data frames in which zero-bit-loaded symbols are set, the CMTS may further send, intermittently or based on a requirement, data frames in which zero-bit-loaded symbols are set, so that the CM can also estimate a plurality of channel parameters.

For the plurality of channel parameters, the CM may calculate, based on a currently estimated channel parameter and a previously estimated channel parameter, a channel parameter actually used for current downlink demodulation. A specific calculation manner is not limited in the present invention, for example, a required channel parameter may be determined in a manner of performing weighting on two channel parameters, or a newly estimated channel parameter may be used as a required channel parameter in a replacement manner, or a required channel parameter may be determined in an iterative updating manner. Different calculation manners may be used for different requirements, thereby improving accuracy of the channel parameter.

The channel parameter estimation method provided in this embodiment of the present invention can be applied to different application scenarios, in addition to a common application scenario in which there is a downlink channel between the CMTS and the CM, the channel parameter estimation method can further be applied to a phase in which a spectrum between the CMTS and the CM is switched from an uplink channel to a downlink channel.

For example, when a downlink data transmission requirement is relatively high, an uplink channel allocated to a CM needs to be switched to a downlink channel, and the CM needs to estimate a channel parameter of the downlink channel switched from the uplink channel. After the channel parameter is obtained through estimation, the CM can correctly demodulate, based on the channel parameter, a data frame obtained through the downlink channel.

In a conventional channel parameter estimation manner, the CM may estimate the channel parameter of the downlink channel based on a discrete pilot signal in the received data frame. However, the CM needs to receive at least one complete data frame, so that the CM can obtain sufficient discrete pilot signals from the data frame, to estimate the channel parameter of the downlink channel. Before estimating the channel parameter of the downlink channel, the CM cannot correctly demodulate data received through the downlink channel. It can be learned that according to the DOCSIS 3.1, when the uplink channel is switched to the downlink channel, it takes a relatively long time for the CM to estimate the channel parameter of the downlink channel. Consequently, time efficiency of spectrum allocation is affected.

Therefore, after the uplink channel between the CM and the CMTS is switched to the downlink channel, the CMTS may send a data frame in which a zero-bit-loaded symbol is set to the CM through the downlink channel, to help the CM estimate a channel parameter of the downlink channel switched from the uplink channel. The zero-bit-loaded symbol occupies only one symbol in the data frame. Therefore, only a time for obtaining a symbol needs to be consumed from starting to estimate the channel parameter of the downlink channel by the CM to estimating the channel parameter by the CM. Therefore, the time consumed by the channel parameter estimation is shortened, and the data frame obtained through the downlink channel can be rapidly demodulated.

Figure 7:
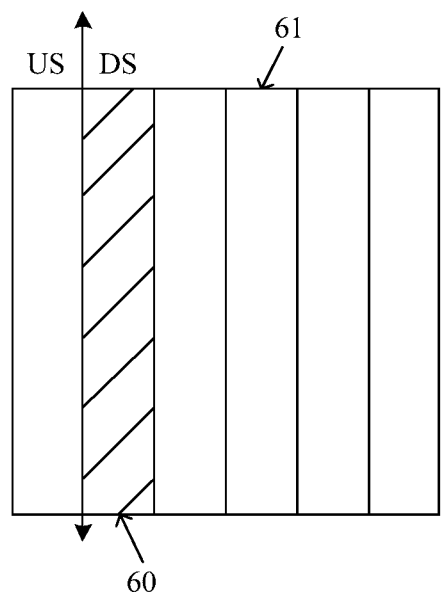
FIG. 7 is a schematic diagram of a sending occasion of a first data frame according to an embodiment of the present invention.

To further shorten the time consumed when the CM estimates the channel parameter after the uplink channel is switched to the downlink channel, the CMTS may use the first data frame as an initial data frame sent to the CM when the uplink channel is switched to the downlink channel, and the initial data frame is the first data frame. For example, as shown in FIG. 7, a location indicated by a double arrow is a location at which the uplink channel is switched to the downlink channel, US is the uplink channel, and DS is the downlink channel. 60 is the zero-bit-loaded symbol in the first data frame, and 61 is another symbol different from the zero-bit-loaded symbol. Therefore, the initial data frame obtained by the CM through the downlink channel is the second data frame obtained in S203. Optionally, the first symbol obtained by the CM through the downlink channel is the zero-bit-loaded symbol of the second data frame.

Figure 8:
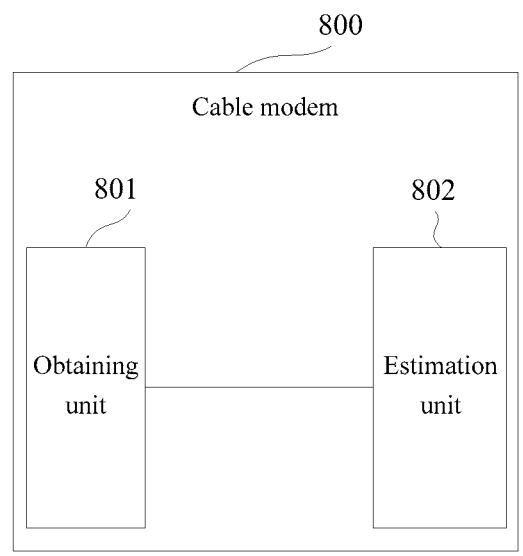
FIG. 8 is an apparatus structural diagram of a cable modem according to an embodiment of the present invention.

FIG. 8 is an apparatus structural diagram of a cable modem 800 according to an embodiment of the present invention. The cable modem CM 800 includes an obtaining unit 801 and an estimation unit 802.

The obtaining unit 801 is configured to obtain a second data frame through a downlink channel. The second data frame is generated after a first data frame sent by a cable modem termination system CMTS is modulated through the downlink channel, the downlink channel is a downlink channel between the CM and the CMTS, the first data frame includes a zero-bit-loaded symbol, the zero-bit-loaded symbol of the first data frame includes no valid codeword, a zero-bit-loaded next codeword pointer NCP and an idle codeword identified by the zero-bit-loaded NCP are set in the zero-bit-loaded symbol of the first data frame, and a data sequence used for channel parameter estimation is filled in the idle codeword.

The obtaining unit 801 is further configured to obtain a zero-bit-loaded symbol of the second data frame from the second data frame.

The estimation unit 802 is configured to estimate a channel parameter of the downlink channel based on the data sequence filled in the zero-bit-loaded symbol of the first data frame and a data sequence filled in the zero-bit-loaded symbol of the second data frame.

Optionally, the obtaining unit is further configured to obtain the second data frame after an uplink channel between the CM and the CMTS is switched to the downlink channel.

Optionally, the second data frame is an initial data frame obtained by the CM through the downlink channel.

Optionally, time domain interleaving has been performed on symbols in the second data frame, and the obtaining unit is further configured to perform time domain de-interleaving on the second data frame, to form the zero-bit-loaded symbol of the second data frame.

Optionally, the CM 800 further includes a determining unit, and the determining unit is configured to determine the zero-bit-loaded symbol of the first data frame.

Optionally, the data sequence filled in the idle codeword is filled by a significant bit in a scrambler based on a cyclic sequence used by the scrambler, and the determining unit is further configured to: determine, based on a location of the zero-bit-loaded symbol of the second data frame in the second data frame, the cyclic sequence used by the scrambler to fill the significant bit in the idle codeword; and determine the zero-bit-loaded symbol of the first data frame based on the cyclic sequence.

Optionally, the data sequence filled in the idle codeword is a fixed sequence, and the determining unit is further configured to determine the zero-bit-loaded symbol of the first data frame based on the fixed sequence.

Optionally, the CM 800 further includes a demodulation unit.

The demodulation unit is configured to demodulate, based on the channel parameter of the downlink channel, a data frame obtained through the downlink channel.

Optionally, the CM 800 further includes a calculation unit.

The calculation unit is configured to determine, based on two neighboring estimated channel parameters, a channel parameter used to demodulate a data frame on the downlink channel.

For feature descriptions in the embodiment corresponding to FIG. 8, refer to related descriptions of the embodiment corresponding to FIG. 1, and details are not described herein one by one.

Figure 9:
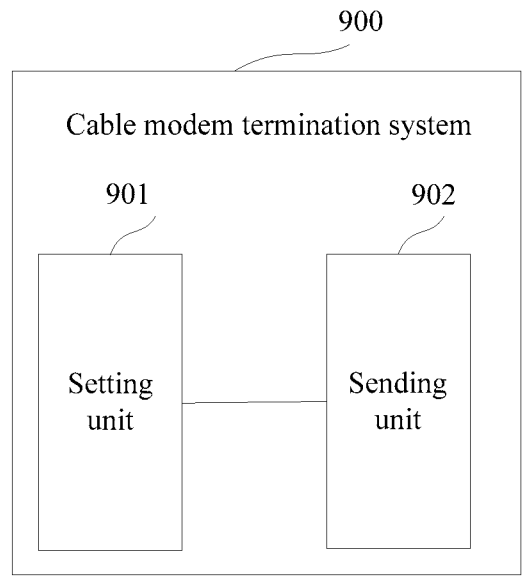
FIG. 9 is an apparatus structural diagram of a cable modem termination system according to an embodiment of the present invention.

FIG. 9 is an apparatus structural diagram of a cable modem termination system 900 according to an embodiment of the present invention. The cable modem termination system CMTS 900 includes a setting unit 901 and a sending unit 902.

The setting unit 901 is configured to set a symbol in a first data frame as a zero-bit-loaded symbol, where all codewords included in the zero-bit-loaded symbol of the first data frame are idle codewords, a zero-bit-loaded next codeword pointer NCP and an idle codeword identified by the zero-bit-loaded NCP are set in the zero-bit-loaded symbol of the first data frame, and a data sequence used for channel parameter estimation is filled in the idle codeword.

The sending unit 902 is configured to send the first data frame to a cable modem CM through a downlink channel between the CMTS and the CM.

Optionally, after an uplink channel between the CM and the CMTS is switched to the downlink channel, the sending unit is further configured to send the first data frame to the CM through the downlink channel.

Optionally, after the uplink channel between the CM and the CMTS is switched to the downlink channel, an initial data frame sent by the sending unit to the CM through the downlink channel is the first data frame.

Optionally, the sending unit is further configured to send the first data frame to the CM through the downlink channel at a fixed period interval.

Optionally, the data sequence filled in the idle codeword is filled by a significant bit in a scrambler based on a cyclic sequence used by the scrambler.

Optionally, the data sequence filled in the idle codeword is a fixed sequence.

For feature descriptions in the embodiment corresponding to FIG. 9, refer to related descriptions of the embodiment corresponding to FIG. 1, and details are not described herein one by one.

Figure 10:
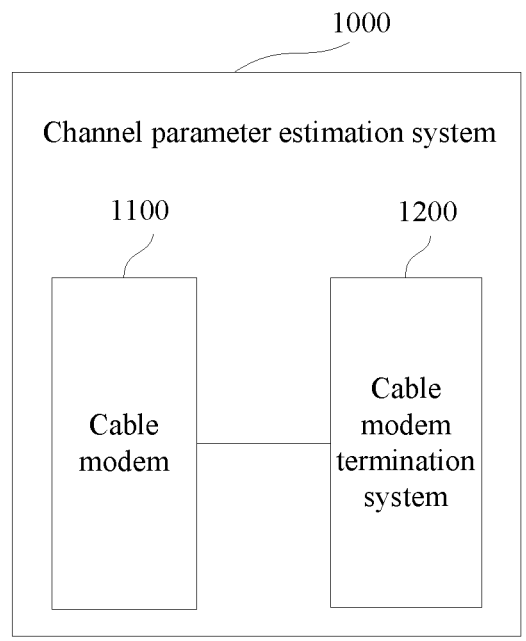
FIG. 10 is a system structural diagram of a channel parameter estimation system according to an embodiment of the present invention.

FIG. 10 is a system structural diagram of a channel parameter estimation system 1000 according to an embodiment of the present invention. The channel parameter estimation system 1000 includes a cable modem CM 1100 and a cable modem termination system CMTS 1200.

The CM 1100 is configured to: obtain a second data frame through a downlink channel, where the second data frame is generated after a first data frame sent by the cable modem termination system CMTS is modulated through the downlink channel, the downlink channel is a downlink channel between the CM and the CMTS, the first data frame includes a zero-bit-loaded symbol, all codewords included in the zero-bit-loaded symbol of the first data frame are idle codewords, a zero-bit-loaded next codeword pointer NCP and an idle codeword identified by the zero-bit-loaded NCP are set in the zero-bit-loaded symbol of the first data frame, and a data sequence used for channel parameter estimation is filled in the idle codeword; obtain a zero-bit-loaded symbol of the second data frame; and estimate a channel parameter of the downlink channel based on the data sequence filled in the zero-bit-loaded symbol of the first data frame and a data sequence filled in the zero-bit-loaded symbol of the second data frame.

The CMTS 1200 is configured to: set a symbol in the first data frame as a zero-bit-loaded symbol; and send the first data frame to the CM through the downlink channel between the CMTS and the CM.

Figure 11:
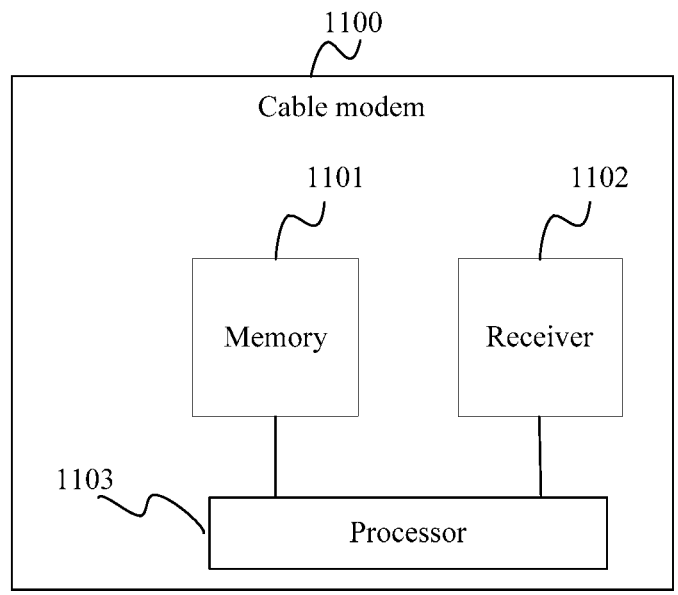
FIG. 11 is a schematic hardware structural diagram of a cable modem according to an embodiment of the present invention.

FIG. 11 is a schematic hardware structural diagram of a cable modem 1100 according to an embodiment of the present invention. The cable modem 1100 includes a memory 1101 and a receiver 1102, and a processor 1103 separately connected to the memory 1101 and the receiver 1102. The memory 1101 is configured to store a group of program instructions, and the processor 1103 is configured to invoke the program instructions stored in the memory 1101 to perform the following operations:

triggering the receiver 1102 to obtain a second data frame through a downlink channel, where the second data frame is generated after a first data frame sent by a CMTS is modulated through the downlink channel, the downlink channel is a downlink channel between a CM and the CMTS, the first data frame includes a zero-bit-loaded symbol, all codewords included in the zero-bit-loaded symbol of the first data frame are idle codewords, a zero-bit-loaded NCP and an idle codeword identified by the zero-bit-loaded NCP are set in the zero-bit-loaded symbol of the first data frame, and a data sequence used for channel parameter estimation is filled in the idle codeword;

obtaining a zero-bit-loaded symbol of the second data frame from the second data frame; and estimating a channel parameter of the downlink channel based on the data sequence filled in the zero-bit-loaded symbol of the first data frame and a data sequence filled in the zero-bit-loaded symbol of the second data frame.

Optionally, the processor 1103 may be a central processing unit (CPU), the memory 1101 may be an internal memory of a random access memory (RAM) type, and the receiver 1102 may include a common physical interface, where the physical interface may be an Ethernet interface or an asynchronous transfer mode (ATM) interface. The processor 1103, the receiver 1102, and the memory 1101 may be integrated into one or more independent circuits or hardware, for example, an application-specific integrated circuit (ASIC).

Figure 12:
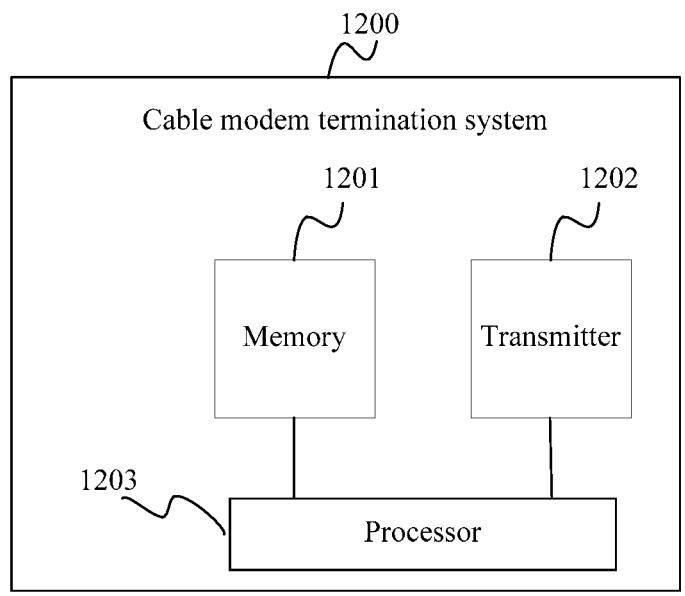
FIG. 12 is a schematic hardware structural diagram of a cable modem termination system according to an embodiment of the present invention.

FIG. 12 is a schematic hardware structural diagram of a cable modem termination system 1200 according to an embodiment of the present invention. The cable modem termination system 1200 includes a memory 1201 and a transmitter 1202, and a processor 1203 separately connected to the memory 1201 and the transmitter 1202. The memory 1201 is configured to store a group of program instructions, and the processor 1203 is configured to invoke the program instructions stored in the memory 1201 to perform the following operations:

setting a symbol in a first data frame as a zero-bit-loaded symbol, where all codewords included in the zero-bit-loaded symbol of the first data frame are idle codewords, a zero-bit-loaded NCP and an idle codeword identified by the zero-bit-loaded NCP are set in the zero-bit-loaded symbol of the first data frame, and a data sequence used for channel parameter estimation is filled in the idle codeword; and triggering the transmitter 1202 to send the first data frame to a CM through a downlink channel between the CMTS and the CM.

Optionally, the processor 1203 may be a CPU, the memory 1201 may be an internal memory of a RAM type, the transmitter 1202 may include a common physical interface, and the physical interface may be an Ethernet interface or an ATM interface. The processor 1203, the transmitter 1202, and the memory 1201 may be integrated into one or more independent circuits or one or more pieces of hardware, for example, an ASIC.

"First" in the first data frame in the embodiments of the present invention is merely used as a name identifier rather than indicating the first in sequence. This rule is also applicable to "second".

A person of ordinary skill in the art may understand that all or some of the steps in the foregoing method embodiments may be implemented by a program instructing relevant hardware. The program may be stored in a computer-readable storage medium. When the program is executed, the steps in the foregoing method embodiments are performed. The storage medium may be at least one of the following media: any medium that can store program code, such as a read-only memory (ROM for short), a RAM, a magnetic disk, or an optical disc.

It should be noted that the embodiments in this specification are all described in a progressive manner, for same or similar parts in the embodiments, refer to these embodiments, and each embodiment focuses on a difference from other embodiments. Especially, device and system embodiments are basically similar to the method embodiments, and therefore are described briefly. For related parts, refer to partial descriptions in the method embodiments. The described device and system embodiments are merely examples. The units described as separate parts may or may not be physically separate, and parts displayed as units may or may not be physical units, may be located in one position, or may be distributed on a plurality of network units. Some or all of the modules may be selected based on actual needs to achieve the objectives of the solutions of the embodiments. A person of ordinary skill in the art may understand and implement the embodiments of the present invention without creative efforts.

The foregoing descriptions are merely implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A channel parameter estimation method, comprising:
    obtaining, by a cable modem (CM), a second data frame through a downlink channel, wherein the second data frame is generated after a first data frame sent by a cable modem termination system (CMTS) is modulated through the downlink channel, wherein the downlink channel is a downlink channel between the CM and the CMTS, wherein the first data frame comprises a zero-bit-loaded symbol, wherein all codewords comprised in the zero-bit-loaded symbol of the first data frame are idle codewords, wherein a zero-bit-loaded next codeword pointer (NCP) and an idle codeword identified by the zero-bit-loaded NCP are set in the zero-bit-loaded symbol of the first data frame, and wherein a data sequence used for channel parameter estimation is filled in the idle codeword;
    obtaining, by the CM, a zero-bit-loaded symbol of the second data frame; and
    estimating, by the CM, a channel parameter of the downlink channel based on the data sequence filled in the zero-bit-loaded symbol of the first data frame and a data sequence filled in the zero-bit-loaded symbol of the second data frame.

2. The method according to claim 1, wherein the obtaining, by a CM, a second data frame through a downlink channel comprises:
    obtaining, by the CM, the second data frame after an uplink channel between the CM and the CMTS is switched to the downlink channel.

3. The method according to claim 2, wherein the second data frame is an initial data frame obtained by the CM through the downlink channel.

4. The method according to claim 1, wherein time domain interleaving has been performed on symbols in the second data frame; and
    wherein the obtaining, by the CM, a zero-bit-loaded symbol of the second data frame comprises:
        performing, by the CM, time domain de-interleaving on the second data frame, to form the zero-bit-loaded symbol of the second data frame.

5. The method according to claim 1, further comprising:
    determining, by the CM, the zero-bit-loaded symbol of the first data frame.

6. The method according to claim 5, wherein the data sequence filled in the idle codeword is filled by a significant bit in a scrambler based on a cyclic sequence used by the scrambler; and
    wherein the determining, by the CM, the zero-bit-loaded symbol of the first data frame comprises:
        determining, by the CM based on a location of the zero-bit-loaded symbol of the second data frame in the second data frame, the cyclic sequence used by the scrambler to fill the significant bit in the idle codeword; and
        determining, by the CM, the zero-bit-loaded symbol of the first data frame based on the cyclic sequence.

7. The method according to claim 5, wherein the data sequence filled in the idle codeword is a fixed sequence; and
    wherein the determining, by the CM, the zero-bit-loaded symbol of the first data frame comprises:
        determining, by the CM, the zero-bit-loaded symbol of the first data frame based on the fixed sequence.

8. A channel parameter estimation method, comprising:
    setting, by a cable modem termination system (CMTS), a symbol in a first data frame as a zero-bit-loaded symbol, wherein all codewords comprised in the zero-bit-loaded symbol of the first data frame are idle codewords, wherein a zero-bit-loaded next codeword pointer (NCP) and an idle codeword identified by the zero-bit-loaded NCP are set in the zero-bit-loaded symbol of the first data frame, and wherein a data sequence used for channel parameter estimation is filled in the idle codeword; and
    sending, by the CMTS, the first data frame to a cable modem (CM) through a downlink channel between the CMTS and the CM.

9. The method according to claim 8, wherein the sending, by the CMTS, the first data frame to a cable modem CM through a downlink channel between the CMTS and the CM comprises:
    after an uplink channel between the CM and the CMTS is switched to the downlink channel, sending, by the CMTS, the first data frame to the CM through the downlink channel.

10. The method according to claim 9, wherein after the uplink channel between the CM and the CMTS is switched to the downlink channel, an initial data frame sent by the CMTS to the CM through the downlink channel is the first data frame.

11. The method according to claim 8, wherein the CMTS sends the first data frame to the CM through the downlink channel at a fixed period interval.

12. The method according to claim 8, wherein the data sequence filled in the idle codeword is filled by a significant bit in a scrambler based on a cyclic sequence used by the scrambler.

13. A cable modem (CM), wherein the CM comprises a memory, a receiver, and at least one processor connected to the memory and the receiver, wherein wherein the memory comprises instructions that when executed by the at least one processor cause the CM to perform the following:
   obtaining a second data frame through a downlink channel, wherein the second data frame is generated after a first data frame sent by a cable modem termination system (CMTS) is modulated through the downlink channel, wherein the downlink channel is a downlink channel between the CM and the CMTS, wherein the first data frame comprises a zero-bit-loaded symbol, wherein all codewords comprised in the zero-bit-loaded symbol of the first data frame are idle codewords, wherein a zero-bit-loaded next codeword pointer (NCP) and an idle codeword identified by the zero-bit-loaded NCP are set in the zero-bit-loaded symbol of the first data frame, and wherein a data sequence used for channel parameter estimation is filled in the idle codeword;
   obtaining a zero-bit-loaded symbol of the second data frame; and
   estimating a channel parameter of the downlink channel based on the data sequence filled in the zero-bit-loaded symbol of the first data frame and a data sequence filled in the zero-bit-loaded symbol of the second data frame.

14. The cable modem according to claim 13, wherein further causing the CM to perform the following: obtaining the second data frame after an uplink channel between the CM and the CMTS is switched to the downlink channel.

15. The cable modem according to claim 14, wherein the second data frame is an initial data frame obtained by the CM through the downlink channel.

16. The cable modem according to claim 13, wherein time domain interleaving has been performed on symbols in the second data frame, and wherein the obtaining a zero-bit-loaded symbol of the second data frame comprises performing time domain de-interleaving on the second data frame to form the zero-bit-loaded symbol of the second data frame.

17. The cable modem according to claim 15, wherein further causing the CM to perform the following:
   determining the zero-bit-loaded symbol of the first data frame;
   wherein the data sequence filled in the idle codeword is filled by a significant bit in a scrambler based on a cyclic sequence used by the scrambler, and wherein the determining the zero-bit-loaded symbol of the first data frame comprises:
      determining, based on a location of the zero-bit-loaded symbol of the second data frame in the second data frame, the cyclic sequence used by the scrambler to fill the significant bit in the idle codeword; and
      determining the zero-bit-loaded symbol of the first data frame based on the cyclic sequence.

18. A cable modem termination system (CMTS), wherein the CMTS comprises a memory, a transmitter, and at least one processor processor connected to the memory and the transmitter, wherein wherein the memory comprises instructions that when executed by the at least one processor cause the CMTS to perform the following:
   setting a symbol in a first data frame as a zero-bit-loaded symbol, wherein the zero-bit-loaded symbol of the first data frame does not comprise any valid codeword, wherein a zero-bit-loaded next codeword pointer NCP and an idle codeword identified by the zero-bit-loaded NCP are set in the zero-bit-loaded symbol of the first data frame, and wherein a data sequence used for channel parameter estimation is filled in the idle codeword; and
   sending the first data frame to a cable modem (CM) through a downlink channel between the CMTS and the CM.

19. The cable modem termination system according to claim 18, wherein further performing: after an uplink channel between the CM and the CMTS is switched to the downlink channel, sending the first data frame to the CM through the downlink channel.

20. The cable modem termination system according to claim 19, wherein further performing: after the uplink channel between the CM and the CMTS is switched to the downlink channel, sending an initial data frame to the CM through the downlink channel is the first data frame.

* * * * *